US011317060B1

(12) United States Patent
Libin

(10) Patent No.: US 11,317,060 B1
(45) Date of Patent: Apr. 26, 2022

(54) INDIVIDUAL VIDEO CONFERENCING SPACES WITH SHARED VIRTUAL CHANNELS AND IMMERSIVE USERS

(71) Applicant: mmhmm inc., Little Rock, AR (US)

(72) Inventor: Phil Libin, San Francisco, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/323,137

(22) Filed: May 18, 2021

Related U.S. Application Data

(60) Provisional application No. 63/026,819, filed on May 19, 2020.

(51) Int. Cl.
*H04N 7/15* (2006.01)
*H04N 5/272* (2006.01)

(52) U.S. Cl.
CPC ............ *H04N 7/157* (2013.01); *H04N 5/272* (2013.01); *H04N 7/155* (2013.01)

(58) Field of Classification Search
USPC .............................................. 348/14.02–14.9
See application file for complete search history.

(56) References Cited

U.S. PATENT DOCUMENTS

| | | | | |
|---|---|---|---|---|
| 6,473,114 B1* | 10/2002 | Strubbe | ............... | H04N 7/15 348/E7.083 |
| 2006/0238548 A1* | 10/2006 | Stotts, Jr. | ............... | G06F 3/14 345/629 |
| 2014/0028781 A1* | 1/2014 | MacDonald | ............... | G06Q 10/10 348/E7.083 |
| 2016/0063873 A1* | 3/2016 | Zimmer | ............... | G06Q 50/20 434/353 |
| 2016/0065880 A1* | 3/2016 | Pearson | ............... | H04N 21/2665 348/14.07 |
| 2017/0039867 A1* | 2/2017 | Fieldman | ............... | H04N 21/2187 |
| 2017/0237788 A1* | 8/2017 | Xi | ............... | H04L 65/4015 709/204 |
| 2019/0188459 A1* | 6/2019 | Ahn | ............... | G06F 3/04817 |
| 2020/0219295 A1* | 7/2020 | el Kaliouby | ............... | G06K 9/6273 |
| 2021/0076105 A1* | 3/2021 | Parmar | ............... | G06F 3/048 |

* cited by examiner

*Primary Examiner* — Maria El-Zoobi
(74) *Attorney, Agent, or Firm* — Muirhead and Saturnelli, LLC

(57) ABSTRACT

Managing a video conference includes presenting, to a plurality of participants of the video conference, a channel pane containing information for the video conference that is controlled by a presenter, the channel pane being provided on a background that is visible to the plurality of participants and superimposing a dynamic image of the presenter on the background. The dynamic image of the presenter is continuously captured by a camera. Managing a video conference also includes adjusting the dynamic image of the presenter to prevent obscuring the information of the channel pane and/or to focus attention of the participants to specific information of the channel pane. The dynamic image of the presenter may be adjusted in response to the channel pane being enlarged and/or moved and/or by shrinking and/or by making the dynamic image semi-transparent. The channel pane may include a physical medium that the presenter actuates.

28 Claims, 13 Drawing Sheets

INDIVIDUAL VIDEO CONFERENCING SPACES WITH SHARED VIRTUAL CHANNELS AND IMMERSIVE USERS

CROSS-REFERENCE TO RELATED APPLICATIONS

This application claims priority to U.S. Prov. App. No. 63/026,819, filed on May 19, 2020, and entitled "INDIVIDUAL CONFERENCE SPACES WITH SHARED VIRTUAL CHANNELS, IMMERSIVE USER PANELS AND COLLABORATIVE EDITING", which is incorporated herein by reference.

TECHNICAL FIELD

This application is directed to the field of video conferencing and presentation of information, and more particularly to the field of individual video conferencing spaces with shared virtual channels and immersive users.

BACKGROUND OF THE INVENTION

Video conferencing has grown into a pervasive communication method. Efficient visual communications between project participants have become a primary productivity factor due to increasing globalization and mobilization of workforce with emphasis on distributed product execution and continuous coordination between participating teams and individual contributors.

Hundreds of general purpose and specialized collaboration systems and tools have been developed to facilitate various aspects of shared project work using video conferencing. In response to the COVID-19 pandemic, which required billions of people to stay at home for the prolonged periods of time and seriously limited travel and other types of in-person communications, video conferencing has almost instantly become the most important productivity medium, connecting people through their work, personal, and family lives. Video conferencing has successfully replaced travel and physical contacts with virtual presence and collaboration.

According to recent market research, the size of global video conferencing market has reached $5.6 billion USD in 2019 and was recently predicted to grow to $10.5 billion by 2027; these projections will likely be dwarfed by the skyrocketing demand in efficient visual communications related to the COVID-19 pandemic and to associated long-term changes in team collaboration and productivity paradigms. On an average day, US businesses have video conferencing meetings with hundreds of millions of daily participants: Zoom alone has over 300 million daily participants of its video meetings; during the quarantine months of 2020, Google Hangout Meets had over 100 million daily participants, while Microsoft Teams had almost 75 million active daily users in 2020.

Recent polls have revealed important usage statistics for video conferencing: 94% of businesses who use video conferencing state that the company benefits from greater productivity; 51% of workers value video conferencing either more or equally as important than business chat applications for their daily work; 43% of workers using video conferencing in a team structure believe that it can enhance their productivity despite the remote working style; 75% of CEOs predict that video conferencing will replace regular conference calls; 54% of the US workforce frequently participates in video conferences; 78% of corporate businesses use video conferencing to facilitate team meetings; and 77.2% businesses use video conferencing to connect with remote employees.

The top six providers of video conferencing services, Zoom, GoToWebinar, Cisco Webex, ON24, GoToMeeting and Adobe Connect, jointly command over 82% of the market share. It was also estimated that, on average, 77% of participants of video conferences join from their notebook or desktop computers, which suggests that most participants have enough screen space for clear views of presenters, thumbnail videos of meeting participants, shared documents and presentations, etc.

Notwithstanding a significant progress in video conferencing products and services, there is a significant room for improvements in their collaborative, communication and editing functions. A multi-cell grid of individual meeting participants does not stimulate free exchange of ideas and aggravates so called "Zoom fatigue". In most videoconferencing solutions, shared documents are separated from their authors and collaborators, so that neither the presentation nor the collaborative editing processes can take advantage of live visual reactions—facial expressions, postures and gestures—of their authors and reviewers, tied to specific portions of documents and providing important non-verbal cues that have been long proven beneficial for live presentations.

Accordingly, it is useful to develop techniques and systems for immersive experiences in video conferencing in order to eliminate user isolation and increase personal touch during collaborative presentations and document editing.

SUMMARY OF THE INVENTION

According to the system described herein, managing a video conference includes presenting, to a plurality of participants of the video conference, a first channel pane containing information for the video conference that is controlled by a presenter, the first channel pane being provided on a background that is visible to the plurality of participants and superimposing a dynamic image of the presenter on the background. The dynamic image of the presenter is continuously captured by a camera. Managing a video conference also includes adjusting the dynamic image of the presenter to prevent obscuring the information of the first channel pane and/or to focus attention of the participants to specific information of the first channel pane. The dynamic image of the presenter may be adjusted in response to the first channel pane being enlarged and/or moved. The dynamic image of the presenter may be adjusted by shrinking the dynamic image. The dynamic image of the presenter may be adjusted by moving the dynamic image. The dynamic image of the presenter may be adjusted by making the dynamic image semi-transparent. The first channel pane may be semi-transparent and the dynamic image of the presenter may be placed behind the first channel pane. At least one of the first channel pane and the dynamic image of the presenter may be color coded to distinguish between the dynamic image of the presenter and the first channel pane. The dynamic image of the presenter may be at least partially superimposed on the first channel pane. The dynamic image of the presenter may include a hand of the presenter that points to specific features of the information of the first channel pane. The first channel pane may include a physical medium that the presenter actuates. The physical medium may be a whiteboard, a writable wall, or a poster. The physical medium may be a tablecloth covering a desk of the presenter. A back portion of the presenter may face the participants while the presenter is writing on the physical medium and the participants may content on the physical medium through the dynamic image of the presenter. Adjusting the dynamic image of the presenter may be performed manually by the presenter. Manually adjusting the dynamic image of the presenter may include choosing a corner of the first channel pane to which the dynamic image is moved. Adjusting the dynamic image of the presenter may be performed automatically. Automatically adjusting the dynamic image of the presenter may be based on looking for blank portions of the channel pane that could accommodate a reasonably scaled down version of the dynamic image of the presenter and neighboring currently commented or updated information of the first channel pane. A dynamic image of a particular one of the participants that is continuously captured by a camera of the particular one of the participants may be superimposed on the background in response to the particular one of the participants becoming a collaborator of the presenter. The particular one of the participants may provide a request to the presenter prior to becoming a collaborator of the presenter. The particular one of the participants may become a collaborator of the presenter by an invitation from the presenter. The presenter and the particular one of the participants may share the first channel pane. The presenter may use the first channel pane and the particular one of the participants may use a second channel pane that is separate from the first channel pane. The first channel pane may be minimized and the presenter and the particular one of the participants may take turns speaking. A portion of the video conference may be pre-recorded. At least some of the portion of the video conference that is pre-recorded may be presented during at least some of a live portion of the video conference. The presenter may control combining and sequencing the portion of the video conference that is pre-recorded and the live portion of the video conference. A previous presenter from the portion of the video conference that is pre-recorded may be replaced with the presenter. The presenter may edit content that is presented at the video conference. The presenter may edit a portion of the video conference that is pre-recorded and that is presented with a live portion of the video conference. Managing a video conference may also include indicating an emotional state of the presenter by applying visual effects to the dynamic image of the presenter and/or by applying sound effects to speech of the presenter. The visual effects may include color coding, emphasizing facial expression, animations, and/or displaying relevant emojis next to the dynamic image of the presenter. The sound effects may include playing sound emoticons and/or other short tunes.

According further to the system described herein, a non-transitory computer readable medium contains software that manages a video conference. The software includes executable code that presents, to a plurality of participants of the video conference, a first channel pane containing information for the video conference that is controlled by a presenter, the first channel pane being provided on a background that is visible to the plurality of participants and executable code that superimposes a dynamic image of the presenter on the background. The dynamic image of the presenter is continuously captured by a camera. The software also includes executable code that adjusts the dynamic image of the presenter to prevent obscuring the information of the first channel pane and/or to focus attention of the participants to specific information of the first channel pane. The dynamic image of the presenter may be adjusted by shrinking the dynamic image. The dynamic image of the presenter may be adjusted by moving the dynamic image. The dynamic image of the presenter may be adjusted by making the dynamic image semi-transparent. The first channel pane may be semi-transparent and the dynamic image of the presenter may be placed behind the first channel pane. At least one of the first channel pane and the dynamic image of the presenter may be color coded to distinguish between the dynamic image of the presenter and the first channel pane. The dynamic image of the presenter may be at least partially superimposed on the first channel pane. The dynamic image of the presenter may include a hand of the presenter that points to specific features of the information of the first channel pane. The first channel pane may include a physical medium that the presenter actuates. The physical medium may be a whiteboard, a writable wall, or a poster. The physical medium may be a tablecloth covering a desk of the presenter. A back portion of the presenter may face the participants while the presenter is writing on the physical medium and the participants may content on the physical medium through the dynamic image of the presenter. Adjusting the dynamic image of the presenter may be performed manually by the presenter. Manually adjusting the dynamic image of the presenter may include choosing a corner of the first channel pane to which the dynamic image is moved. Adjusting the dynamic image of the presenter may be performed automatically. Automatically adjusting the dynamic image of the presenter may be based on looking for blank portions of the channel pane that could accommodate a reasonably scaled down version of the dynamic image of the presenter and neighboring currently commented or updated information of the first channel pane. A dynamic image of a particular one of the participants that is continuously captured by a camera of the particular one of the participants may be superimposed on the background in response to the particular one of the participants becoming a collaborator of the presenter. The particular one of the participants may provide a request to the presenter prior to becoming a collaborator of the presenter. The particular one of the participants may become a collaborator of the presenter by an invitation from the presenter. The presenter and the particular one of the participants may share the first channel pane. The presenter may use the first channel pane and the particular one of the participants may use a second channel pane that is separate from the first channel pane. The first channel pane may be minimized and the presenter and the particular one of the participants may take turns speaking. A portion of the video conference may be pre-recorded. At least some of the portion of the video conference that is pre-recorded may be presented during at least some of a live portion of the video conference. The presenter may control combining and sequencing the portion of the video conference that is pre-recorded and the live portion of the video conference. A previous presenter from the portion of the video conference that is pre-recorded may be replaced with the presenter. The presenter may edit content that is presented at the video conference. The presenter may edit a portion of the video conference that is pre-recorded and that is presented with a live portion of the video conference. The software may also include executable code that indicates an emotional state of the presenter by applying visual effects to the dynamic image of the presenter and/or by applying sound effects to speech of the presenter. The visual effects may include color coding, emphasizing facial expression, animations, and/or displaying relevant emojis next to the dynamic image of the presenter. The sound effects may include playing sound emoticons and/or other short tunes.

The proposed system creates virtual shareable backgrounds and zoomable presentation channels within physical spaces, such as individual rooms or other locations of presenters, individual and panel speakers and other meeting participants, immerses a dynamic image of a presenter captured by camera(s) of a presenter in front or behind of a channel display, allowing live immersive presentations and document editing, and secures permanent visibility of displayed channel materials by manual or automatic repositioning and rescaling of presenter's image and displaying presenter's image in a semi-transparent mode when necessary. The system may alter an image of a presenter to reveal and illustrate various emotional states of the presenter through visual effects. In addition to permanent visibility of displayed channel materials, repositioning, rescaling and altering an image of the presenter through visual and audio effects, and pointing by the presenter with a hand of the presenter to portions of information displayed in the channel may enhance the presentation by focusing attention of the participants to such portions of information in the channel. The system also supports immersion of multiple participants in front of the shared background and one or multiple presentation channels, enabling conversational panels, collaborative content editing and parallel presentations when multiple collaborators appear in front of a channel display. Meeting participants may be invited by a presenter to the immersive collaborative presentation or may put a request for the immersive presentation mode. The system may replay pre-recorded past video meetings and may support pre-recorded and live presentations with a mixed (hybrid) mode where pre-recorded content is combined with immersive commentators, co-presenters, collaboration and additional presentation channels that the meeting participants may create.

Various aspects of system functioning are explained as follows.

1. Individual and group locations. Meeting participants may join a video conference from individual locations, such as their office desks and homes (rooms, patios, gardens, etc.) or in groups from conference rooms, huddle rooms and other office or non-office areas. The proposed system may turn any participant location into an individual conference space and an immersive collaborative center of the meeting. For certain situations, such as quarantines, social distancing requirements during the pandemic or highly distributed workforce residing in various places, individual rooms and other locations at properties of the participants may become natural collaborative focal points of video conferences.

2. Backgrounds and shared channels. Custom virtual backgrounds displayed at individual or group locations of meeting participants have become a popular feature of various video conferencing systems and add-on software, such as browser plug-ins. Such backgrounds may serve the purpose of visual hygiene (for example, hiding an unprepared view of a participant's room due to a time difference between participants' time zones, a home remodeling project, etc.), visual attractiveness, entertainment and other purposes. Custom backgrounds may imitate different wall materials (stone, brick, wood, paint, wallpaper), display landscapes, cityscapes, works of art, abstract decorations. Custom backgrounds may be static or animated and may be tangentially related to a meeting subject: for example, the custom backgrounds may display brand colors and marks of participating companies or illustrate project themes. However, custom backgrounds are not expected to be actively and continuously controlled by meeting participants and may not represent a significant part of a video meeting.

In contrast, shared channels are panes of active meeting content, such as a presentation, a mutually viewed video clip, a whiteboard brainstorm, etc. Channels may be opened by a presenter on any portion of a custom background of the presenter. Channel content may be controlled by a presenter or by multiple collaborators, as explained elsewhere herein. Channels may also be opened on any physical surface in an individual conference space of a presenter, such as a whiteboard, a writable IdeaPaint wall, a poster, a paper or a special tablecloth covering desk or table or the presenter (provided the video equipment may capture writing of the presenter on such horizontal surfaces), etc. The presenter and collaborators may open one or several channels in the individual conference space at any time.

3. Immersive presenter image. The system may continuously capture dynamic images of a head view, waist view or other view of the presenter, obtained by available technical means in an individual video conference space of the presenter and often facilitated by a physical or virtual green screen. In contrast with traditional video conferencing features, the system may keep continuously captured dynamic images of the presenter in front (and sometimes behind) the currently open presentation channel(s), enabling live virtual presentation enhanced with facial expressions, gestures and speech directly tied to the presented meeting content when the presenter is demonstrating, discussing or editing the content. At different moments, the presenter may appear before meeting participants in the front view, three quarter or profile view (slightly or significantly turned toward the channel pane), three quarter back view (looking at or pointing to the channel presentation, manipulating with or editing the content), back view (for example, when the presenter is writing on a whiteboard), etc. The system ensures that, while the dynamic image of the presenter is sufficiently close to the interactive channel pane(s), the image of the presenter does not obstruct, at any time, the channel content for other meeting participants, which may be achieved by various display and control means, as explained in detail elsewhere herein.

4. Zoomable channel content and repositioning presenter's image. At different phases of presentation, viewing requirements for a channel pane may change. A sparse text content with bullet points in large font may accommodate a relatively small portion of the channel pane. In such a case, an image of the presenter may appear at a relatively large size, typically on the side of the channel pane. In contrast, a dense slide, packed with numeric tables, graphs, charts and images, may routinely need a near full-screen zoom, and at times may require an additional zoom-in to view fine details of the content. When the system expands the channel pane to occupy almost all available background in an individual conference space of the presenter, the image of the presenter may significantly obstruct the content view. The system may alleviate the issue by shrinking the image of the presenter and moving the image of the presenter toward one of the corners of the channel pane. The presenter may also control the image size manually, and may select a zoom ratio, choose a corner and alter the size and position of the image dynamically, depending on the portion of the current content in the channel that is to be visible.

The system may also automatically resize and reposition the image of the presenter based on the continuous analysis of the channel content (predominantly in case of the relatively static channel content, such as slides or other illustrations, as opposed to videos) by looking for blank portions of the content that could accommodate a reasonably scaled down image of the presenter and neighboring currently commented or updated content.

5. Semi-transparent presenter image and editing channel content. Presentation logic may require the presenter to point to the channel content or modify the channel content in middle portions of the channel pane, when obstructing the channel view with an image of the presenter is unavoidable. Note that the presenter may edit the information in the presentation pane at any time. The system may address this issue by either implementing different types of pointers and visible cursors or by displaying the image of the presenter in a semi-transparent mode that appears in front of the channel pane. With a semi-transparent presenter image, facial expressions, gestures and fine hand/finger movements (when the presenter manipulates/edits the channel content) may still remain visible to other meeting participants when the transparency level is correctly chosen. Semi-transparent display mode of the dynamic images of the presenter may be especially efficient to show to the conference participants the drawings and the drawing process on the whiteboards, walls, posters and other physical media in the individual conference space, when the presenter is standing in front of the drawing, inevitably obstructing a view of the drawing from other conference participants. Color coding of the semi-transparent image of the presenter may additionally facilitate content viewability.

Transparency may also be used both for the virtual channel pane and for the immersive presenter image to put the presenter behind the presentation content. In this case, a semitransparent presenter image with facial expressions, pointing gestures and other features explained in this section, is viewed through a semi-transparent channel content panel; color coding of the image of the presenter and appropriate transparency levels of both the content panel and the image of the presenter may help differentiating between the image of the presenter and the channel content.

6. Highlighting presenter's emotional state. The system may underscore an emotional state of the presenter by applying, for example, visual and/or sound effects to image and speech of the presenter. Color coding, emphasizing facial expression, animations, displaying relevant emojis next to the image of the presenter, playing sound emoticons and other short tunes may be used interchangeably or in combination for highlighting an emotional state of the presenter. Such highlights may be controlled directly by the presenter, by an assistant of the presenter, or other participants under an explicit permission from the presenter and possibly also from conference organizers; alternatively, the highlights may be automatically or semi-automatically generated by the system using facial and gesture recognition software that may be continuously processing a video stream of the presenter.

7. Adding collaborators; collaboration rules and types. A one-person shared channel presentation from an individual conference space of a presenter may be expanded to include other collaborators, immersed in front of the opened channel(s) with the same or reduced commenting and editing capabilities as the presenter. Such immersion may use the video stream (a sequence of dynamic images) of a meeting participant different from the presenter, captured by a camera of the participant, separated from a physical or virtual environment of the participant (for example, using a physical of virtual green screen) and overlaid on top of the individual conference space. The original presenter and the collaborator(s) may see the same display with the continuously rendered physical environment or virtual background, the channel pane(s) of the individual conference space and images thereof superimposed over a presentation environment. Accordingly, the original presenter and the collaborator(s) may operate within the presentation environment as if being physically present in the individual conference space from the start of the video conference.

In order to join the presentation in the individual conference space, a new collaborator may have to either be invited by the presenter and give a consent to enter the presentation or, symmetrically, send a request for an immersive collaboration and receive permission from the presenter. Once a collaborator addition is approved, an image of the collaborator may be added to the individual conference space in front or behind the shared channel(s), as explained elsewhere herein.

The system may designate a new position for the collaborator in front of the channel pane, so that the original image of the presenter and the image of the collaborator do not overlap or obstruct each other. Subsequently, the system may continue processing the video streams, supporting the combined views of the presenter and the collaborator(s) so that the presenter and all collaborators are simultaneously and synchronously immersed in front of the common background and in front or behind the channel pane(s).

The presenter with the collaborating team may continue a joint presentation and editing of the channel content, as explained elsewhere herein, using common sense rules for taking turns in speaking and interacting with the channel content. Depending on collaboration rules set by, for example, the meeting organizers or presenters, collaborators (co-presenters) may be allowed to open additional channels in the shared individual conference space of the original presenter and display content of the collaborator(s) or augmentations/comments to the main presentation. Co-presenters may also alternate different presentations within any number of channels.

Depending on the presentation nature and flow, dynamic images of the presenter and collaborator(s) (co-presenter(s)) may be repositioned synchronously to appear close to the same content in the presentation pane (for example, when one of the co-presenters manipulates, points at or highlights the channel content and another is speaking) or may appear at different places in the individual conference space. Thus, for example, the main presenter may go through a quarterly report presentation, while a co-presenter may open another shared channel close to the first one and illustrate the quarterly report with details and accompanying materials, taking turns with the main presenter. In addition to the visual collaboration in presenting and editing the channel content, the system may support a speaking panel without explicitly referring to the channel content; such speaking panels may or may not have immersive or remote moderator(s). The conference may freely switch between presentations and speaking panels; the beginning of a speaking panel may be indicated by an automatic minimization or hiding of an existing channel content or the whole video conference may be arranged as a speaking panel without a channel content.

8. Recording and replaying past presentations. The system may be constantly recording video conferences with immersive presenters, collaborators, reactions and comments of other (non-immersive) participants, etc. Such recordings or their fragments may be replayed during new video conferences; for example, such replays may be done within a dedicated channel opened by a presenter, a meeting organizer or another participant.

Replays may be combined with the live ongoing video conferences; thus, a presenter may start commenting on a previous recording or editing content of a previous recording when an editing mode is available. Alternatively, a recorded video conference may emulate a full meeting experience of a current conference and may be replayed by occupying a whole individual conference space of a participant who initiated the replay. In this case, a combined mode may include an immersion of the participant who initiated the replay or other collaborators into the replay, an optional masking (hiding) of an original presenter of the recorded meeting, and a gradual shift of the combined pre-recorded (asynchronous) and live meeting into a fully synchronous live meeting.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein offers a technique for creating and conducting video conferences from an individual conference space with shared virtual content channels and immersive co-presenters.

Figure 1:
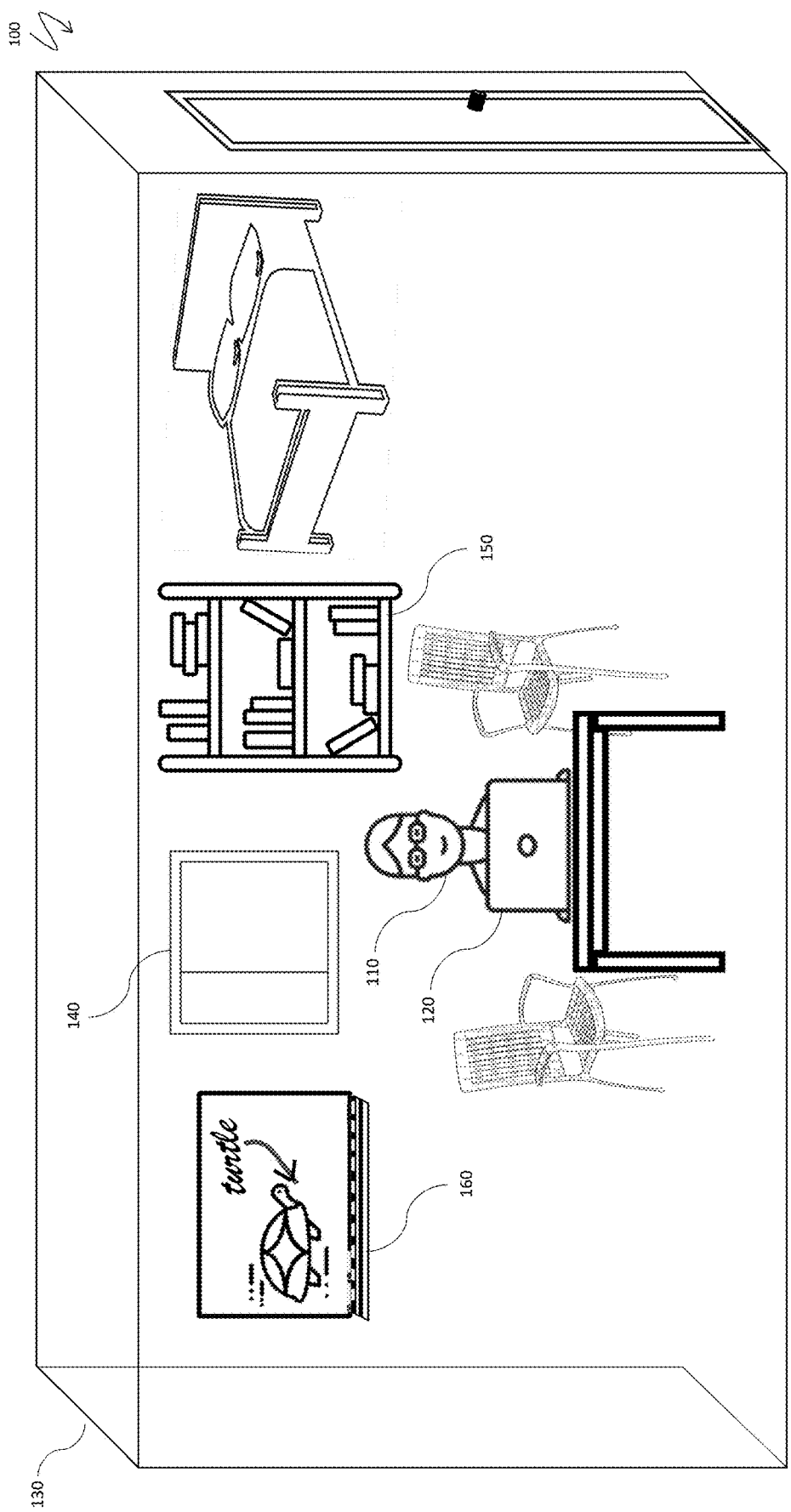
FIG. 1 is a schematic illustration of an individual conference space of a presenter, according to an embodiment of the system described herein.

FIG. 1 is a schematic illustration 100 of an individual conference space 130 of a presenter 110. The presenter 110 has a notebook 120 and is sitting at a desk located within the individual conference space 130 with a window 140, furniture 150 and whiteboard 160.

Figure 2:
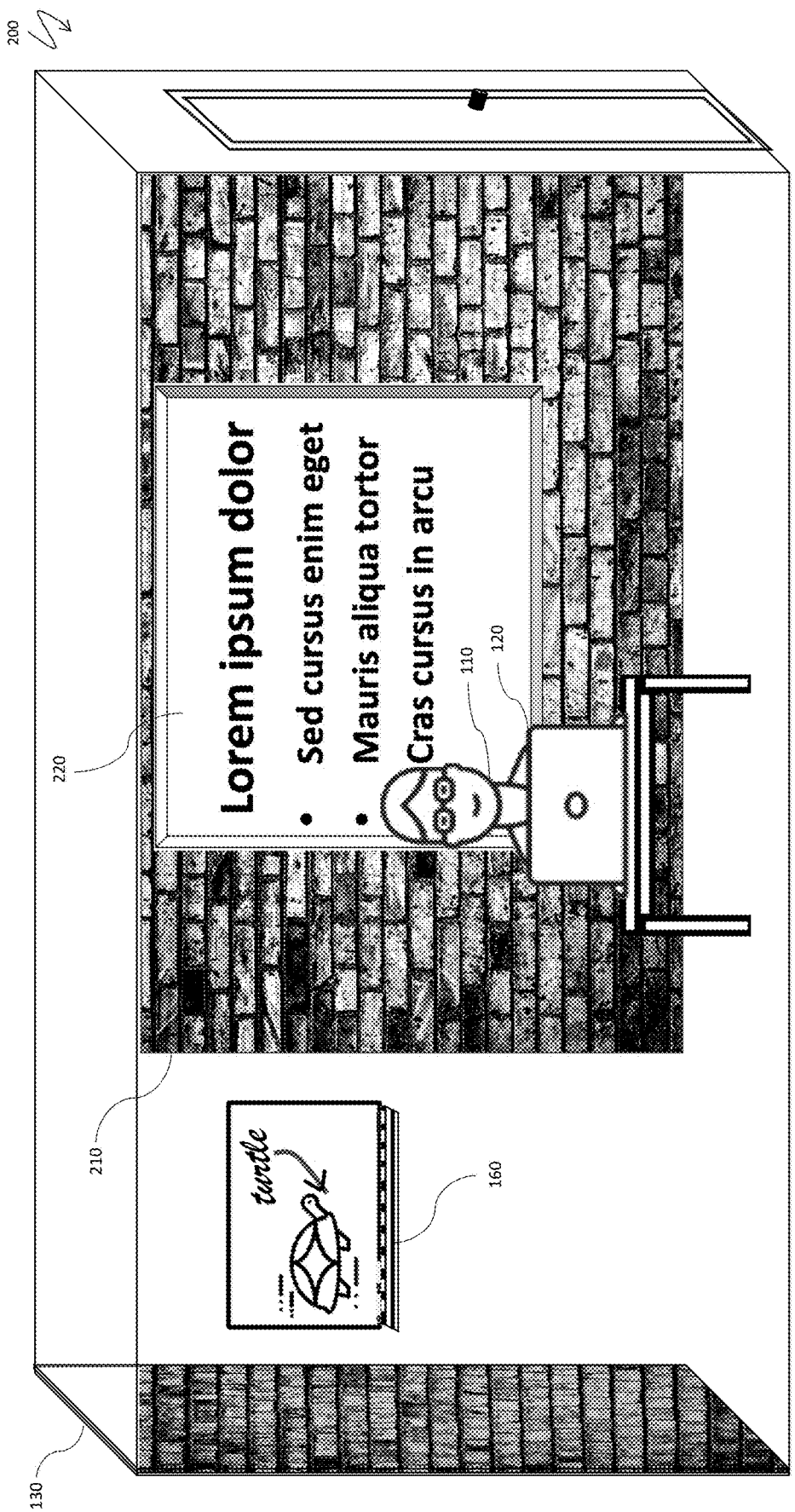
FIG. 2 is a schematic illustration of creating an individual conference space with a virtual background and shared presentation channels, according to an embodiment of the system described herein.

FIG. 2 is a schematic illustration 200 of modifying the individual conference space 130 to include a virtual background 210 and shared presentation channels. The presenter 110 has the notebook 120 and is sitting at the desk located within the individual conference space 130 with the whiteboard 160. The virtual background 210 replaces the physical background (see FIG. 1). A shared virtual channel has been opened and is displayed in a pane 220 close to the virtual background 210. The channel pane 220 shows a presentation slide. Note that the pane 220 may be arranged at any position and angle with respect to the virtual background 210 within the individual conference space 130, thus emulating a 3D effect of a whiteboard or a poster.

Figure 3:
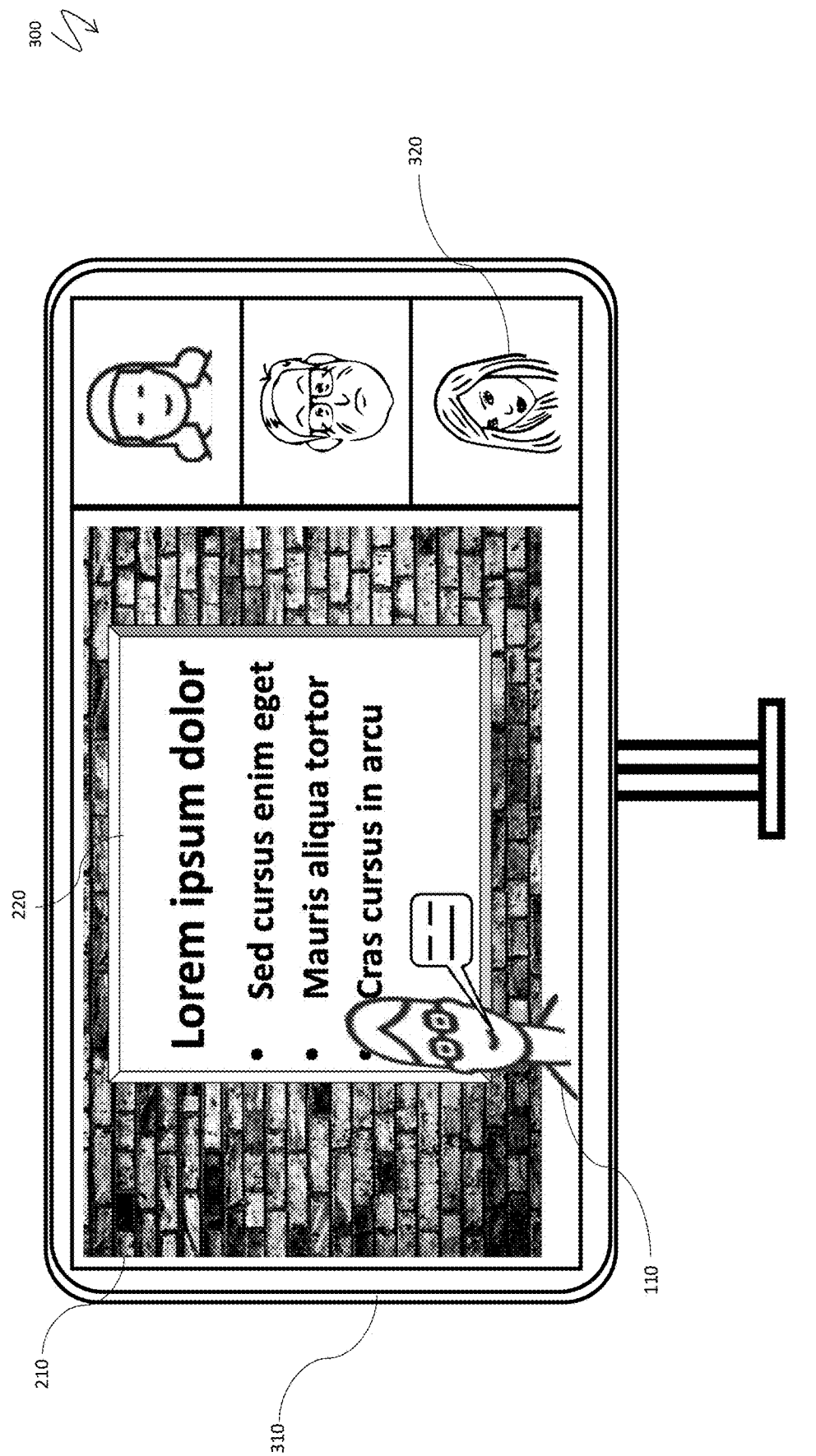
FIG. 3 is a schematic illustration of presenting in front of a regular channel pane, according to an embodiment of the system described herein.

FIG. 3 is a schematic illustration 300 of presenting in front of the channel pane 220. The presenter 110 is superimposed over the channel pane 220 that is displaying the presentation slide. The presenter 110 speaks in front of the pane 220, which, in turn, is displayed on top of the virtual background 210 to form an immersive presentation that is displayed on the monitor 310 during a video conference with participants 320.

Figure 4:
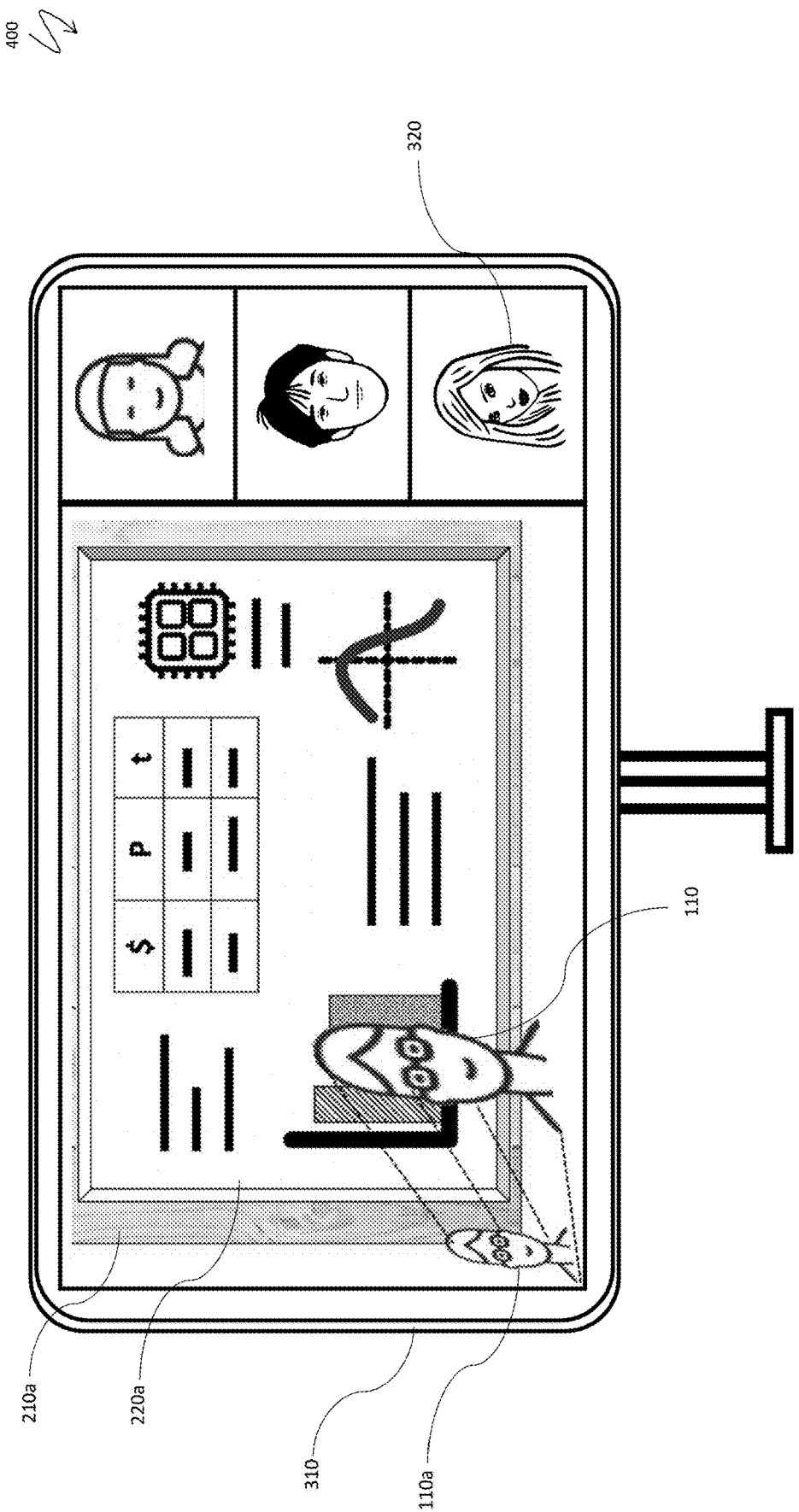
FIG. 4 is a schematic illustration of expanding a channel pane with the simultaneous zooming out of a presenter image, according to an embodiment of the system described herein.

FIG. 4 is a schematic illustration 400 of expanding a channel pane with simultaneous zooming out of a presenter image. A content rich slide is presented in an expanded pane 220a to the full screen, so that the expanded pane 220a almost covers a modified virtual background 210a. In FIG. 3, the presenter 110 is presenting in front of the (smaller) pane 220. In FIG. 4, the image of the presenter 110 obstructs the view of content of the slide. As a result, the image of the presenter is scaled down and positioned on a side of the channel pane 220a, as shown by a revised image 110a of the presenter 110. Scaling down the image may be done automatically by the system or manually by the presenter 110, as explained elsewhere herein. As with FIG. 3, the video conference with the presenter 110 is displayed on the monitor 310 for the other meeting participants 320.

Figure 5:
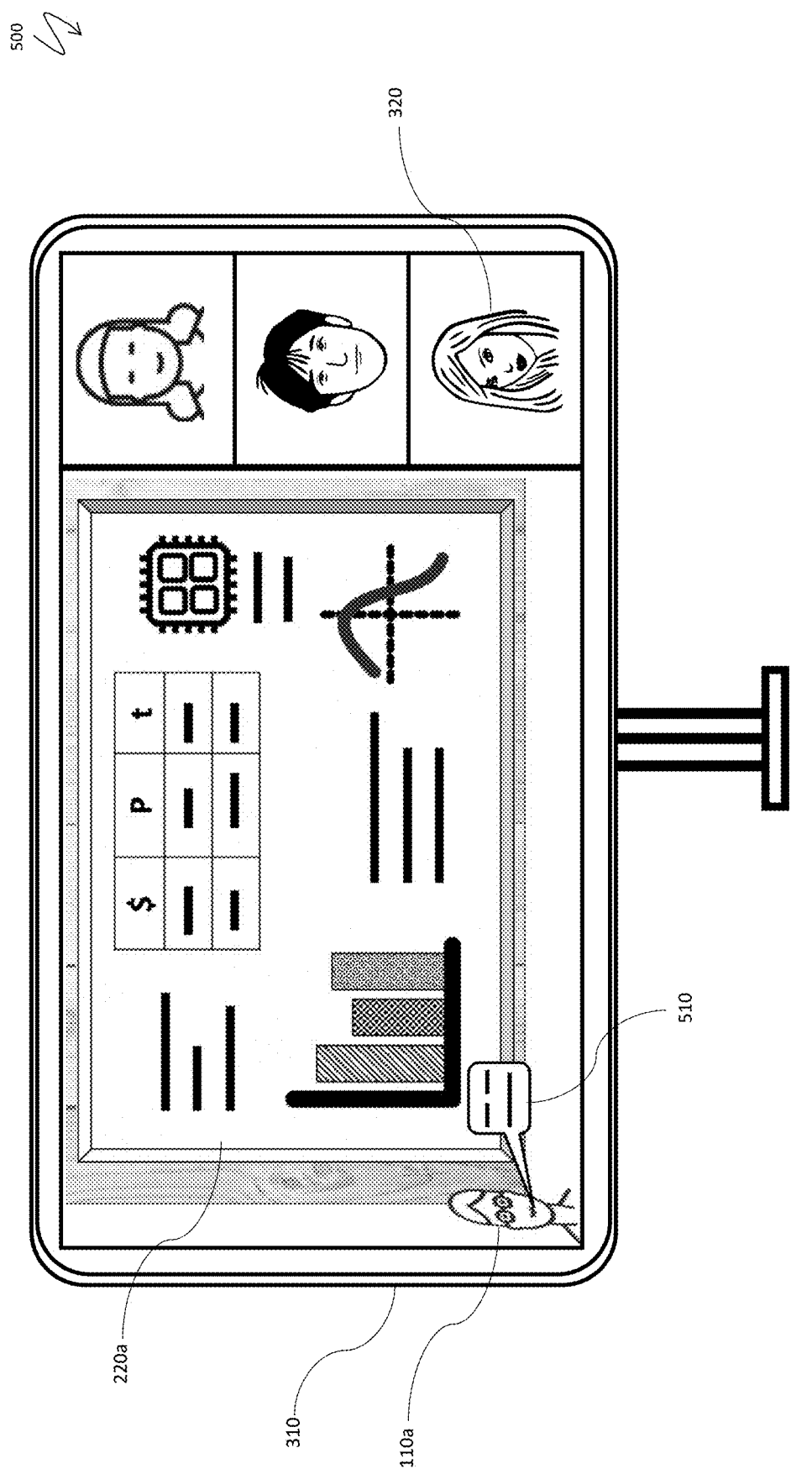
FIG. 5 is a schematic illustration of presenting in front of an expanded channel pane, according to an embodiment of the system described herein.

FIG. 5 is a schematic illustration 500 of presenting in front of the expanded channel pane 220a, which is the immediate continuation of the actions of transitioning from the pane 220 to the expanded pane 220a, as well as the automatic or manual resizing and repositioning of the image 110a of the presenter. In FIG. 5, the presenter has resumed the presentation and is speaking, as shown by a talk callout 510. Just as with FIG. 3 and FIG. 4, the video conference with the individual conference space, virtual background, channel pane 220a and the immersed presenter are all displayed on the monitor 310 for the video conference participants 320.

Figure 6:
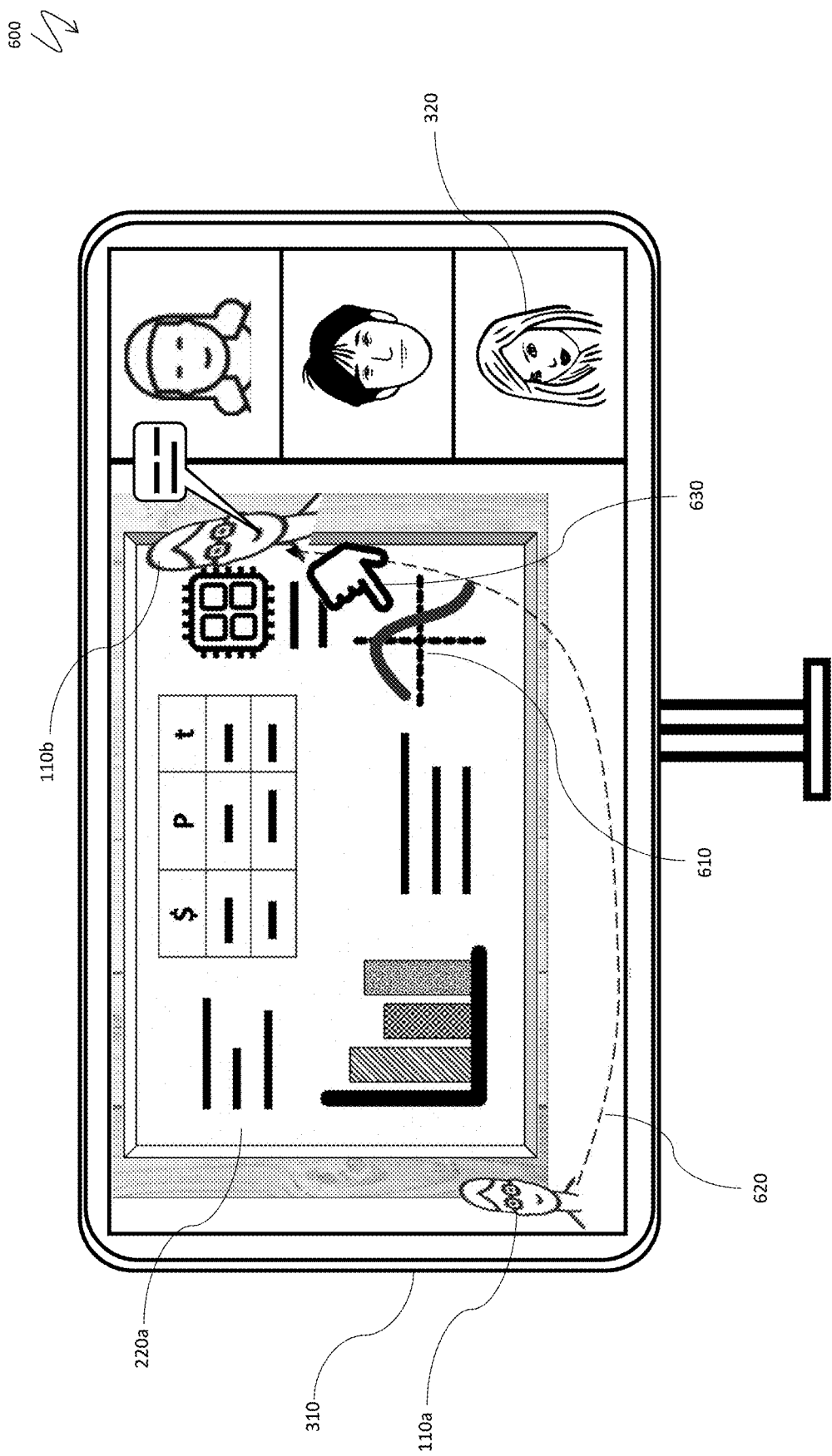
FIG. 6 is a schematic illustration of repositioning a dynamic image of a presenter to enable pointing to channel content, according to an embodiment of the system described herein.

FIG. 6 is a schematic illustration 600 of repositioning a dynamic image 110b of the presenter to enable pointing to channel content. The presentation layout of FIG. 6 is similar to that of FIGS. 4, 5; FIG. 6 includes the expanded channel pane 220a. However, the dynamic image 110a of the presenter is positioned on the screen unfavorably because the presenter wishes to explain a specific portion of the channel content, a graph 610 located on an opposite side of the slide. Therefore, the dynamic image 110b of the presenter is repositioned as illustrated by a trajectory 620 (where intermediate positions of the dynamic image of the presenter may be briefly displayed—not shown in FIG. 6). In the image 110b, the presenter may use his hand with a finger 630 to point directly at a portion of the graph 610 of the slide content, displayed in the expanded channel pane 220a. As previously, the monitor 310 shows the video conference layout with the participants 320.

Figure 7:
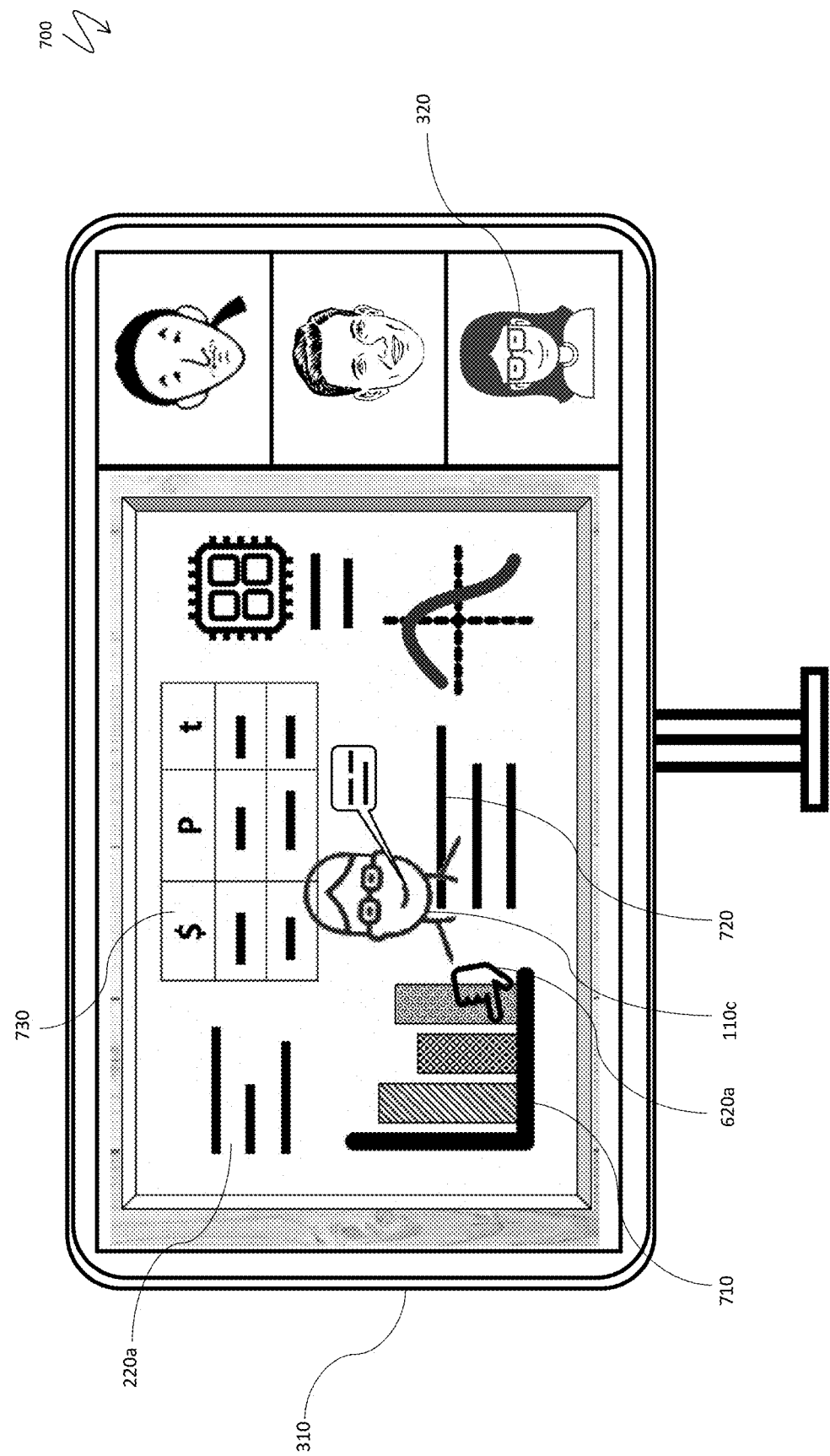
FIG. 7 is a schematic illustration of a semi-transparent dynamic image of a presenter overlaying a channel pane, according to an embodiment of the system described herein.

FIG. 7 is a schematic illustration 700 of a semi-transparent dynamic image of a presenter overlaying the channel pane 220a. The general layout of the video conference with the monitor 310, participants 320 and expanded channel pane 220a is similar to that of FIGS. 4-6. However, in FIG. 7 the presenter is explaining the chart 710 with references to accompanying text 720. The best position for consistent presentation is in the middle of the channel pane 220a (the middle of the slide content), between the items 710, 720. So, a dynamic image 110c of the presenter is beneficially positioned and, in addition, the dynamic image is made semi-transparent, so that both the dynamic image of the head of the presenter and a hand 620a of the presenter do not cause any significant obstruction of the slide content, including the items 710, 720, which are visible through the semi-transparent dynamic images 620a of the hand and 110c of the shoulder and neck of the presenter. In addition, a table 730 above the dynamic image 110c of the presenter also will not be obstructed even if the image 110c is moved up the pane 220a. Note that the position and size and transparency of the image 110c may be controlled either manually or automatically, as explained elsewhere herein.

Figure 8:
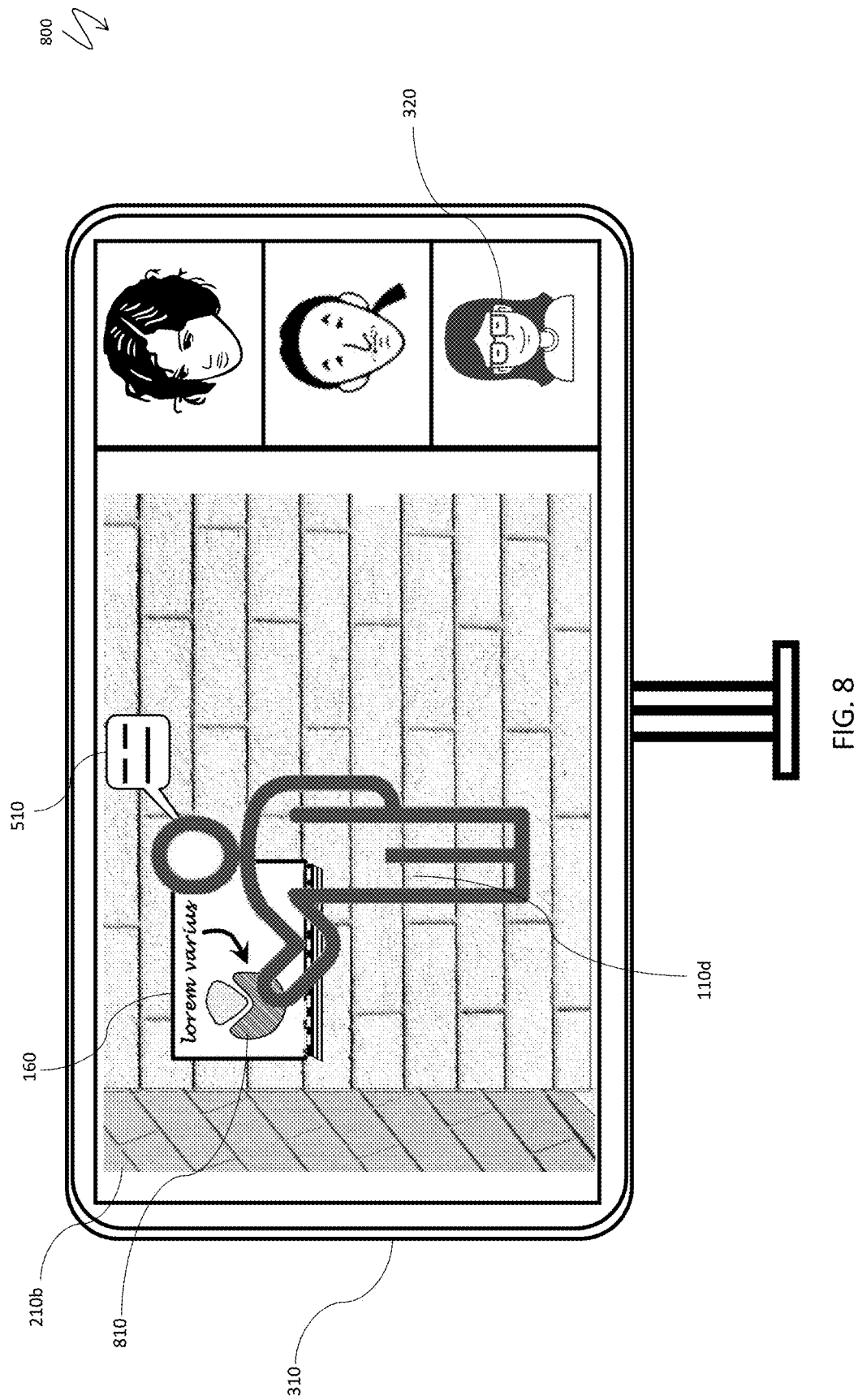
FIG. 8 is a schematic illustration of a semi-transparent dynamic image of a presenter displayed during drawing by the presenter in a physical channel, according to an embodiment of the system described herein.

FIG. 8 is a schematic illustration 800 of a semi-transparent dynamic image of the presenter displayed while a presenter draws in a physical channel. The conference layout with the monitor 310 and participants 320 is similar to other FIG.s herein. The physical whiteboard 160 (see FIGS. 1, 2 and the accompanying text) is physically mounted on a wall of the individual conference space 130 (the room in FIGS. 1, 2). Rendering of the physical room space of FIG. 1 is replaced with a virtual background 210b. A transparent full-height dynamic image 110d of the presenter is shown next to the whiteboard 160, where the presenter may be drawing a portion of content 810 of the whiteboard 160 or pointing to the content 810 while standing with the back of the presenter toward the viewers. In either case, the content 810 and the rest of the whiteboard 160 may be seen by video conference participants because of the semi-transparency of the dynamic image of the presenter, so the presenter continues the presentation in confidence, as illustrated by the talk callout 510.

Figure 9:
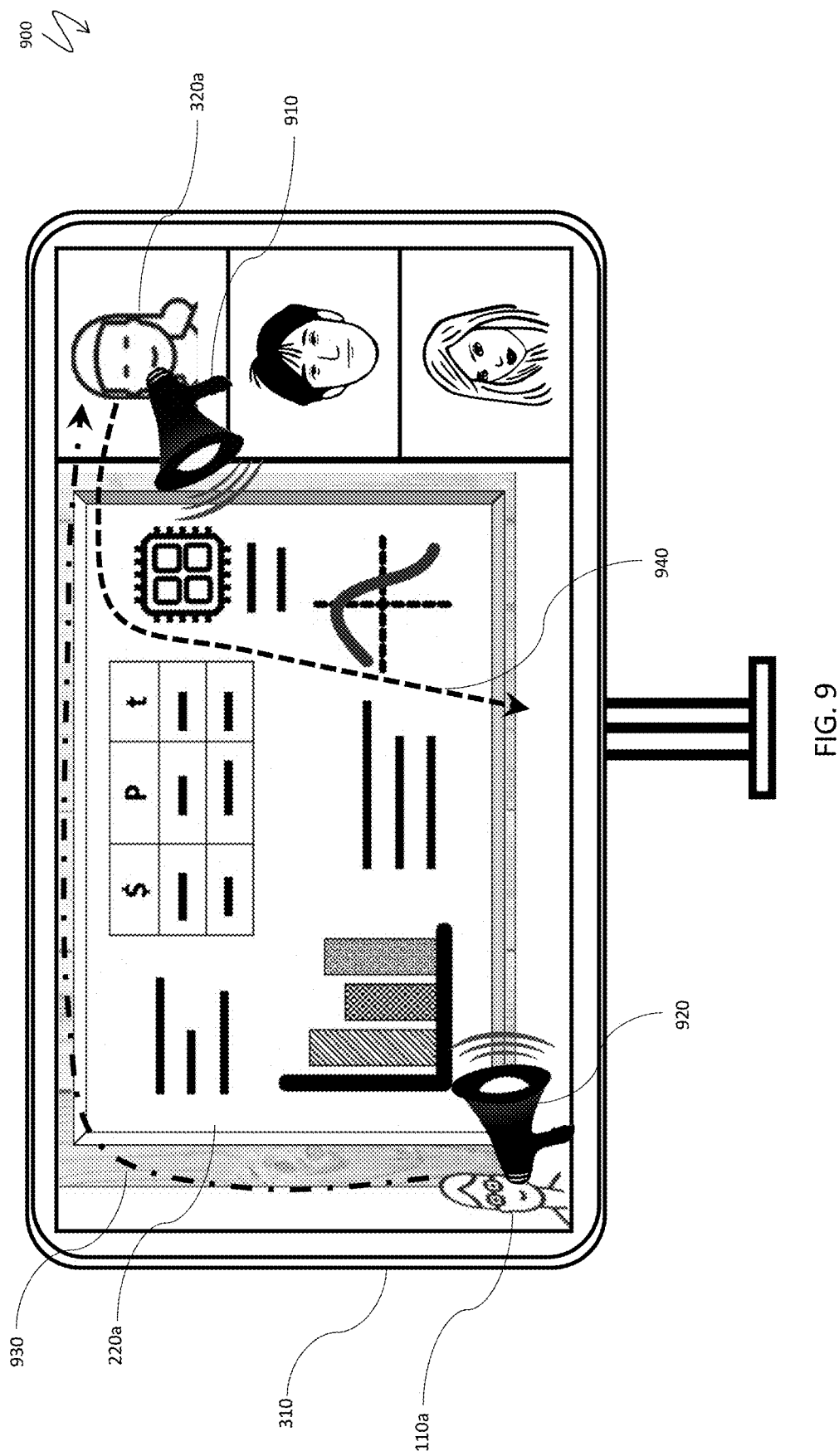
FIG. 9 is a schematic illustration of a collaboration request and invitation, according to an embodiment of the system described herein.

FIG. 9 is a schematic illustration 900 of a collaboration request and invitation. With a similar video conference layout to FIGS. 3-8 shown on the monitor 310, a user 320a enters a request for joining the presentation as an immersive collaborator, as illustrated by a megaphone 910; note that the request may be pronounced verbally or texted through a video conference public or private chat channel. The presenter 110a may respond with an invitation using a reciprocal communication means 920, as shown by a dash-dotted arrow 930. Subsequently, the participant 320a may leave her space in the participant grid and her rendered image may join the presenter in the presentation space, as schematically shown by a dotted arrow 940 and explained elsewhere herein.

FIGS. 10A-10D are schematic illustrations of different collaboration scenarios. General layouts of all four video conferences include the monitor 310 and the grid with the participants 320.

Figure 10B:
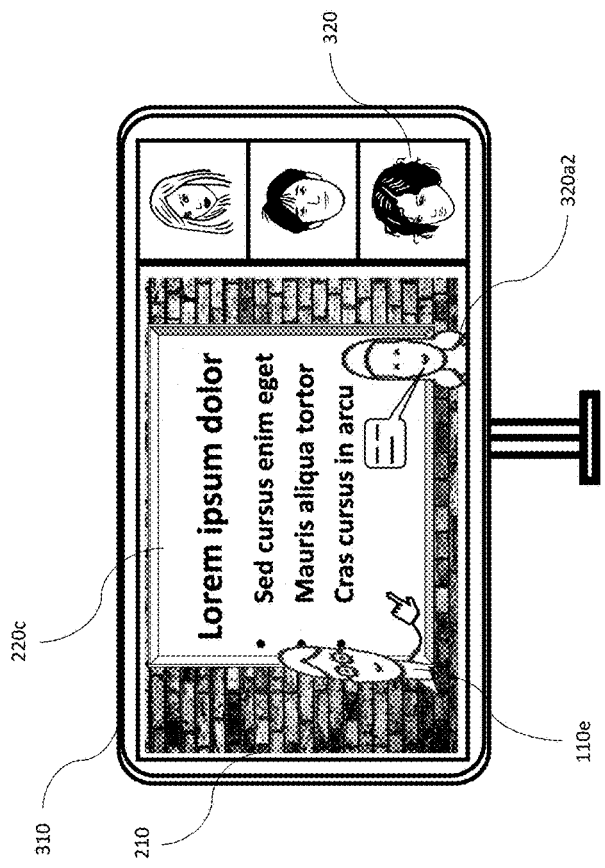
FIGS. 10A-10D are schematic illustrations of different collaboration scenarios, according to embodiments of the system described herein.
Figure 10A:
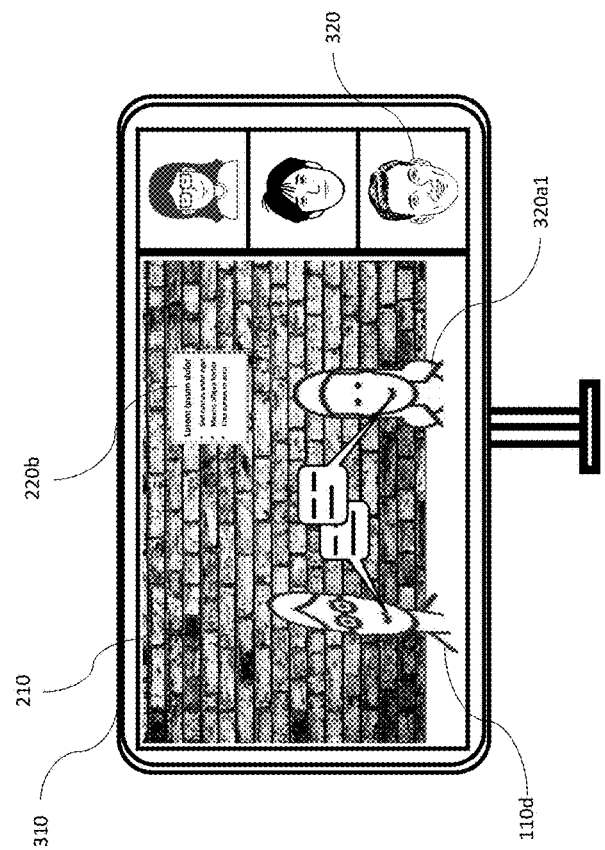

FIG. 10A is a schematic illustration of a panel talk. The conference space environment includes the virtual background 210 (see FIGS. 2, 3) and a minimized shared channel pane 220b. Dynamic images 110d of the presenter 320a1 of a collaborator are positioned next to each other and the presenter and the collaborator are talking in turn, which is characteristic of a panel talk (unmoderated).

FIG. 10B is a schematic illustration of a joint presentation in one shared channel. The conference space environment includes the virtual background 210 shown in in FIG. 10A and a channel pane 220c with a single presentation slide deck common for both the original presenter and the collaborator. In this case, a dynamic image 110e of the original presenter 110e points at content in the channel pane 220c, while a dynamic image 320a2 of the collaborator (co-presenter) is shown talking about the presented content.

Figure 10D:
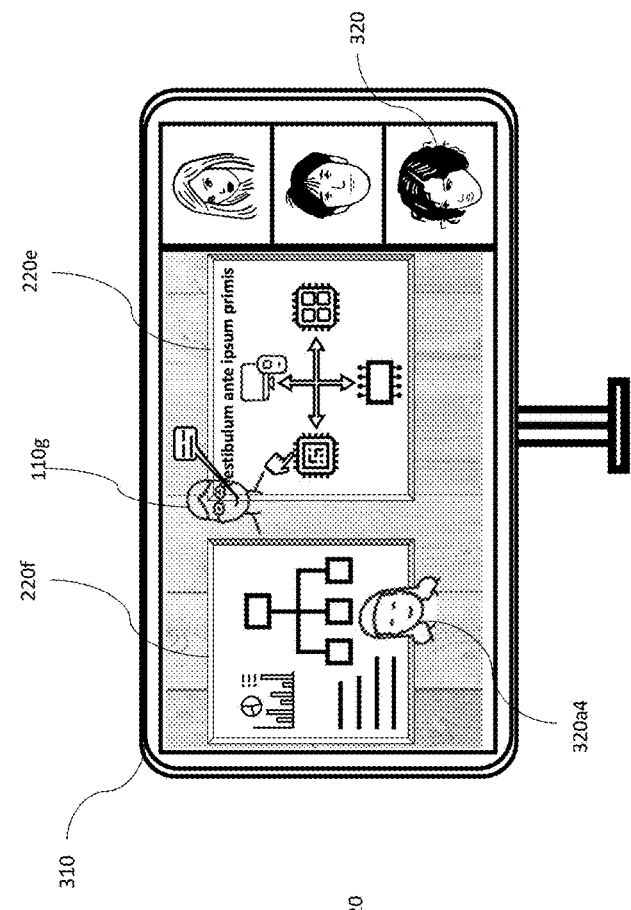
Figure 10C:
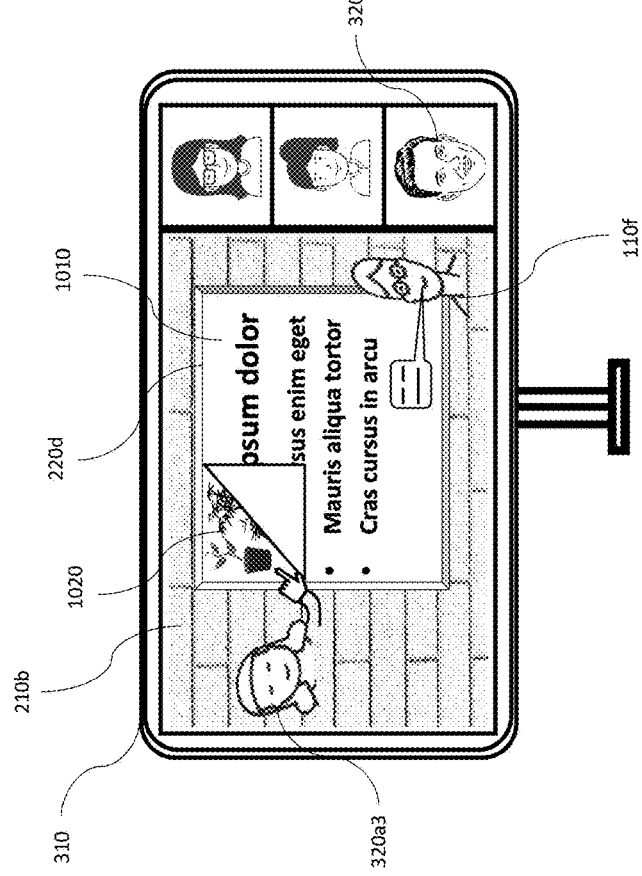

FIG. 10C is a schematic illustration of two different presentations in one shared channel, which may include alternating documents with potentially related content. The conference space environment includes a channel pane 220d displayed over the virtual background 210b (introduced in connection with FIG. 8). A dynamic image 110f of the presenter is shown talking in conjunction with one presentation, while a dynamic image 320a3 of a co-presenter is shown pointing at another presentation, displayed in the same channel. There may be different sub-scenarios of such presentations: (i) the main presenter may show a condensed slide deck, while the co-presenter may illustrate and enrich the core presentation with examples and graphics; (ii) two brief presentations by the main presenter and the co-presenter (second presenter) may follow each other during a video conference; (iii) the co-presenter may entertain the participants of the video conference in short breaks of a heavy and lengthy main presentation; etc.

FIG. 10D is a schematic illustration of two parallel presentations in different shared channels opened in two adjacent channel panes. An image 110g of a main presenter is shown presenting a content displayed in a channel pane 220e, while a dynamic image 320a4 of a co-presenter (or a second independent presenter) is shown presenting a different content displayed in a channel pane 220f. As explained elsewhere herein, the presentations may be alternating or sequential different presentations or connected presentations, similar to the item (i) in the accompanying text to FIG. 10C, except the two presentations in FIG. 10D have separate channel panes.

Figure 11:
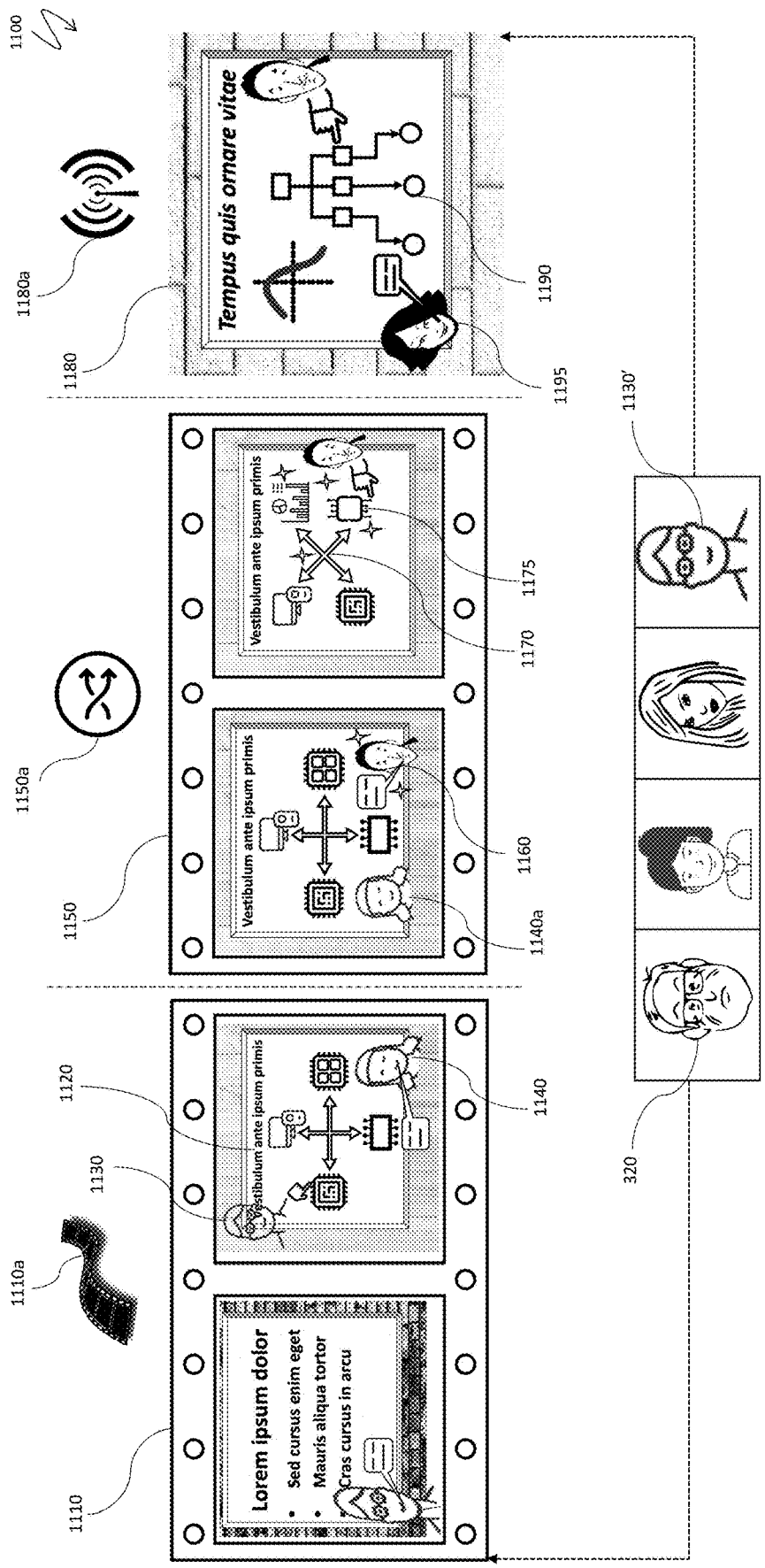
FIG. 11 is a schematic illustration of combining pre-recorded, mixed and live video conferences, according to an embodiment of the system described herein.

FIG. 11 is a schematic illustration 1100 of combining pre-recorded, mixed and live video conferences. A video conference starts with a pre-recorded segment 1110, as indicated by a film strip sign 1110*a* and a shape of the surrounding frame. The segment 1110 includes two slots similar to the conferences conducted in an individual conference space and shown in FIGS. 3, 10D. Note that a dynamic image 1130 of a main presenter in the second slot of the pre-recorded segment 1110, which includes a shared channel pane 1120 and a dynamic image 1140 of a co-presenter, is shown watching the segment as a participant 1130' among the set of all participants 320.

Following the pre-recorded segment 1100 is a mixed video conference segment 1150 marked by a mixed process sign 1150*a*. The segment 1150 also includes two slots. At a start of the first slot, a live user 1160 joins the video conference, replacing the image 1130 of the main presenter, where the image 1130 is hidden in the second segment 1150 of the video conference. In the first slot, the second presenter 1140 still appears in the individual conference space and the new main presenter 1160 may be delivering new presentation and commenting on the pre-recorded presentation within the available breaks in the pre-recorded presentation associated with a presenter 1140*a* who continues the pre-recorded portion of the video conference. Note that the content of the shared channel pane corresponds to the pre-recorded segment. This situation changes in the second slot, where the new main presenter both edits the pre-recorded content (shown by an item 1170) and adds a new content 1175.

A third segment 1180 (marked by an online process sign 1180*a*) is a live portion of the video conference, where new content 1190 is presented in the channel pane and the main presenter is joined by a co-presenter 1195.

Figure 12:
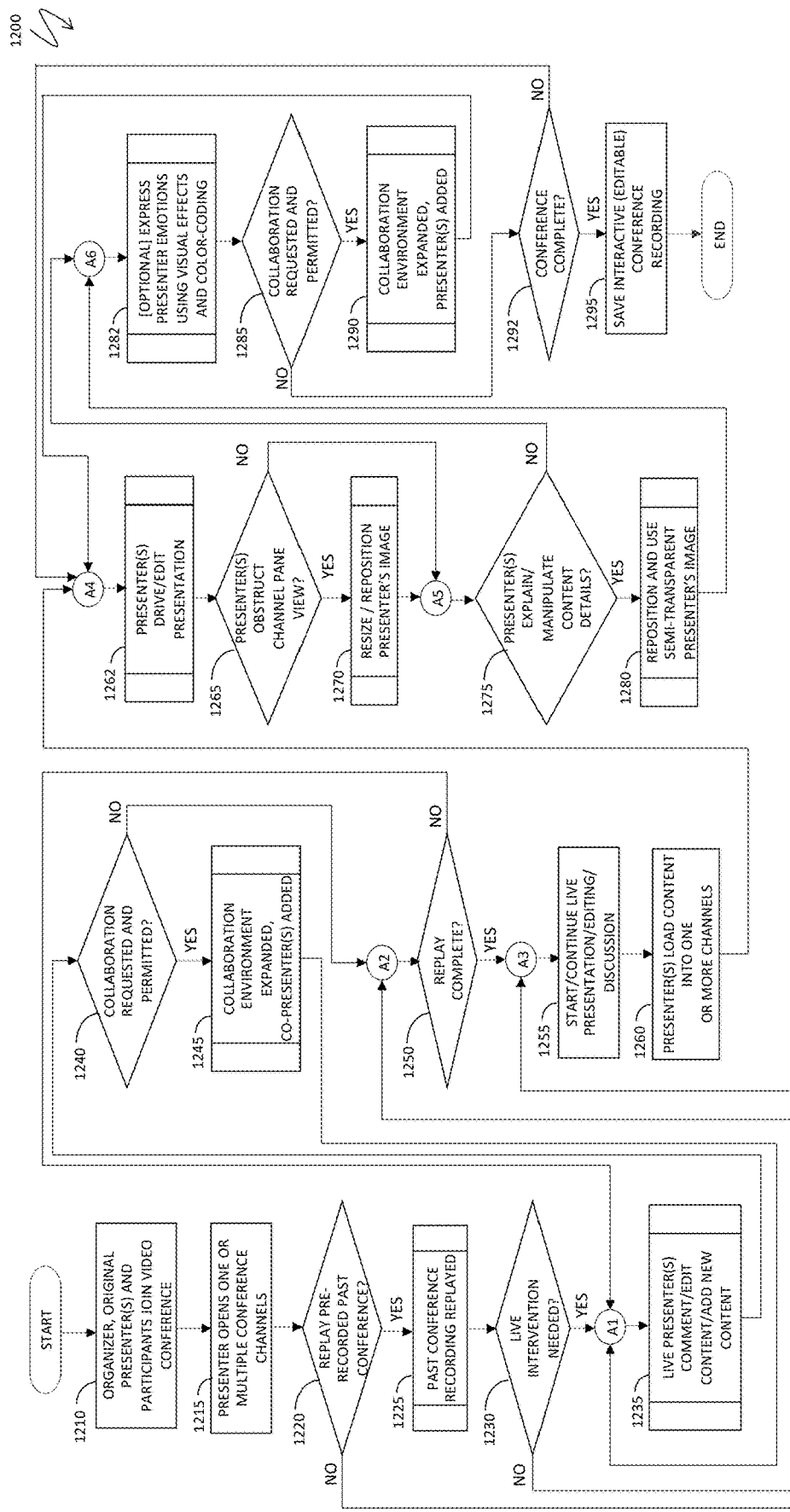
FIG. 12 is a system flow diagram illustrating system functioning in connection with immersive presentations from individual conference spaces, according to an embodiment of the system described herein.

Referring to FIG. 12, a system flow diagram 1200 illustrates system functioning in connection with immersive presentations from individual conference spaces. Processing begins at a step 1210, where an organizer, original presenter(s) and participants join the video conference. After the step 1210, processing proceeds to a step 1215, where the main presenter opens one or multiple conference channels, as explained elsewhere herein. After the step 1215, processing proceeds to a test step 1220, where it is determined whether a pre-recorded portion of a past presentation must be replayed. If so, processing proceeds to a step 1225, where a past recording is replayed, as explained elsewhere herein (see, for example, FIG. 11 and the accompanying text). After the step 1225, processing proceeds to a test step 1230, where it is determined whether a live intervention is to be provided. If so, processing proceeds to a step 1235, where the live presenter(s) comment, edit content or add new content to the pre-recorded presentation (see, for example, segment 1150 in FIG. 11). After the step 1235, processing proceeds to a test step 1240, where it is determined whether a collaboration request has been received from a meeting participant and approved by a presenter (see, for example, FIG. 9). If so, processing proceeds to a step 1245, where the collaboration environment is expanded and co-presenters added, as explained elsewhere herein (see, for example, FIGS. 10*a*-10D). After the step 1245, processing proceeds to the step 1235, which may be independently reached from the test step 1230.

If it is determined at the test step 1240 that no collaboration requests have been requested and approved, processing proceeds to a test step 1250, where it is determined whether the replay of pre-recorded presentation is complete. If not, processing proceeds to the step 1235, which may be independently reached from the test step 1230 and the step 1245. Otherwise, processing proceeds to a step 1255, where a live presentation, content editing or discussion are started or continued. Note that the step 1255 may be independently reached from the test step 1220 if it is determined that a pre-recorded portion of a past presentation must not be replayed. After the step 1255, processing proceeds to a step 1260, where the presenter(s) load the content into one or more previously opened shared channels, as explained elsewhere therein. After the step 1260, processing proceeds to a step 1262, where a presenter or multiple presenters drive and edit the presentation (possibly in multiple channels), as explained elsewhere herein (see, for example, FIGS. 3-8, 10A-10D). After the step 1262, processing proceeds to a test step 1265, where it is determined whether a presenter (or one of the co-presenters) obstructs the view of the channel pane. If so, processing proceeds to a step 1270 where presenter's (or co-presenter's) dynamic image is resized and repositioned (see, for example, FIGS. 4-6 and the accompanying texts).

After the step 1270, processing proceeds to a test step 1275, where it is determined whether a presenter or a co-presenter are explaining or manipulating content details (which may cause dynamic image(s) of the presenter or co-presenter to interfere with the content visibility, as explained in more detail in FIGS. 7, 8 and the accompanying text). If so, processing proceeds to a step 1280, where presenter's (or co-presenter's) dynamic image is repositioned to become adjacent to the relevant content details and made semi-transparent to combine content manipulations and explanations with content visibility to other video conference participants (FIGS. 7, 8). After the step 1280, processing proceeds to a step 1282, where presenter emotions may be optionally revealed through visual effects (including emoticons, color coding, etc., as explained elsewhere herein—see, for example, sub-section 6 in the Summary section). Note that the step 1282 may be independently reached from the test step 1275 if it is determined that the presenter or a co-presenter are not explaining or manipulating content details.

After the step 1282, processing proceeds to a test step 1285, where it is determined whether a collaboration request has been received from a meeting participant and approved by a presenter (see, for example, FIG. 9). If so, processing proceeds to a step 1290, where the collaboration environment is expanded and co-presenters added, as explained elsewhere herein (see, for example, FIGS. 10*a*-10D). After the step 1290, processing proceeds to the step 1262, which may be independently reached from the test step 1260. If it is determined at the test step 1285 that no collaboration requests have been requested and approved, processing proceeds to a test step 1292, where it is determined whether the video conference is complete. If not, processing proceeds to the step 1262, which may be independently reached from the test step 1260 and the step 1290. Otherwise, processing proceeds to a step 1295, where an interactive editable video conference recording is saved. After the step 1295, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers. Smartphones and tablets may use operating system(s) selected from the group consisting of: iOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing a video conference, comprising:
presenting, to a plurality of participants of the video conference, a first channel pane containing information for the video conference that is controlled by a presenter, the first channel pane being provided on a background that is visible to the plurality of participants;
superimposing a dynamic image of the presenter on the background, the dynamic image of the presenter being continuously captured by a camera; and
adjusting the dynamic image of the presenter to prevent obscuring the information of the first channel pane and/or to focus attention of the participants to specific information of the first channel pane, wherein a dynamic image of a particular one of the participants that is continuously captured by a camera of the particular one of the participants is superimposed on the background in response to the particular one of the participants becoming a collaborator of the presenter.

2. A method, according to claim 1, wherein the particular one of the participants provides a request to the presenter prior to becoming a collaborator of the presenter.

3. A method, according to claim 1, wherein the particular one of the participants becomes a collaborator of the presenter by an invitation from the presenter.

4. A method, according to claim 1, wherein the presenter and the particular one of the participants share the first channel pane.

5. A method, according to claim 1, wherein the presenter uses the first channel pane and the particular one of the participants uses a second channel pane that is separate from the first channel pane.

6. A method, according to claim 1, wherein the first channel pane is minimized and the presenter and the particular one of the participants take turns speaking.

7. A method, according to claim 1, wherein a portion of the video conference is pre-recorded.

8. A method, according to claim 7, wherein at least some of the portion of the video conference that is pre-recorded is presented during at least some of a live portion of the video conference.

9. A method, according to claim 8, further comprising:
combining and sequencing the portion of the video conference that is pre-recorded and the live portion of the video conference.

10. A method, according to claim 8, wherein a previous presenter from the portion of the video conference that is pre-recorded is replaced with the presenter.

11. A method, according to claim 1, further comprising:
editing content that is presented at the video conference.

12. A method, according to claim 8, further comprising:
editing a portion of the video conference that is pre-recorded and that is presented with a live portion of the video conference.

13. A method, according to claim 1, further comprising:
indicating an emotional state of the presenter by applying visual effects to the dynamic image of the presenter and/or by applying sound effects to speech of the presenter.

14. A method, according to claim 13, wherein the visual effects include at least one of: color coding, emphasizing facial expression, animations, or displaying relevant emojis next to the dynamic image of the presenter.

15. A method, according to claim 13, wherein the sound effects include at least one of: playing sound emoticons and other short tunes.

16. A method, according to claim 1, wherein the presenter or the particular one of the participants is semi-transparent.

17. A method, according to claim 5, wherein the dynamic image is adjusted in response to the first channel pane being enlarged and/or moved.

18. A method, according to claim 1, wherein the dynamic image is adjusted by shrinking the dynamic image.

19. A method, according to claim 1, wherein the dynamic image is adjusted by moving the dynamic image.

20. A method, according to claim 1, wherein the dynamic image is adjusted by making the dynamic image semi-transparent.

21. A method according to claim 1, wherein the first channel pane is semi-transparent and the dynamic image is placed behind the first channel pane.

22. A method, according to claim 21, wherein at least one of the first channel pane and the dynamic image are shown to the participants in different colors to facilitate content viewability of the dynamic image of the presenter and the first channel pane.

23. A method, according to claim 1, wherein the dynamic image is at least partially superimposed on the first channel pane.

24. A method, according to claim 23, wherein the dynamic image includes a hand of the presenter that points to specific features of the information of the first channel pane.

25. A method, according to claim 1, wherein adjusting the dynamic image is performed manually.

26. A method, according to claim 25, wherein manually adjusting the dynamic image includes choosing a corner of the first channel pane to which the dynamic image is moved.

27. A method, according to claim 1, wherein adjusting the dynamic image is performed automatically.

28. A method, according to claim 27, wherein automatically adjusting the dynamic image is based on looking for blank portions of the channel pane that could accommodate a reasonably scaled down version of the dynamic image and neighboring currently commented or updated information of the first channel pane.

* * * * *